(12) United States Patent
Smith

(10) Patent No.: US 7,520,650 B2
(45) Date of Patent: Apr. 21, 2009

(54) SIDE-EMITTING COLLIMATOR

(75) Inventor: Todd J. Smith, Deep River, CT (US)

(73) Assignee: Whelen Engineering Company, Inc., Chester, CT (US)

( * ) Notice: Subject to any disclaimer, the term of this patent is extended or adjusted under 35 U.S.C. 154(b) by 316 days.

(21) Appl. No.: 11/435,682

(22) Filed: May 17, 2006

(65) Prior Publication Data

US 2006/0291201 A1    Dec. 28, 2006

Related U.S. Application Data

(63) Continuation-in-part of application No. 10/878,846, filed on Jun. 28, 2004, now Pat. No. 7,083,313.

(51) Int. Cl.
F21V 7/04    (2006.01)
(52) U.S. Cl. .................. 362/555; 362/551; 362/511; 362/545; 362/327; 362/328
(58) Field of Classification Search .......... 362/327, 362/333, 335, 338, 511, 545, 551, 555, 328; 385/146
See application file for complete search history.

(56) References Cited

U.S. PATENT DOCUMENTS

| | | | |
|---|---|---|---|
| 1,339,604 A | 5/1920 | Morrison | |
| 5,404,869 A | 4/1995 | Parkyn, Jr. et al. | 126/699 |
| 5,947,587 A | 9/1999 | Keuper et al. | 362/235 |
| 6,157,500 A | 12/2000 | Yamazaki et al. | 359/741 |
| 6,264,347 B1 | 7/2001 | Godbillon et al. | 362/331 |
| 6,409,141 B1 | 6/2002 | Yamazaki et al. | 249/117 |
| 6,641,284 B2 | 11/2003 | Stopa et al. | 362/240 |
| 6,679,621 B2 * | 1/2004 | West et al. | 362/327 |
| 6,724,543 B1 | 4/2004 | Chinniah et al. | 359/718 |
| 6,739,738 B1 | 5/2004 | Smith | 362/317 |
| 6,851,835 B2 | 2/2005 | Smith et al. | 362/305 |
| 6,940,660 B2 | 9/2005 | Blümel | 359/726 |
| 2002/0105801 A1 | 8/2002 | Martineau | 362/244 |
| 2005/0190563 A1 | 9/2005 | Li et al. | 362/332 |

* cited by examiner

Primary Examiner—Stephen F Husar
(74) Attorney, Agent, or Firm—Alix, Yale & Ristas, LLP

(57) ABSTRACT

Illumination configurations employ optical elements configured to organize divergent light from an LED light source into collimated beams having a direction perpendicular to an optical axis of the LED. Alternative optical elements organize light from a row of LEDs into planes perpendicular to a plane including the optical axes of the LEDs. Pairs of optical elements are configured to define a cavity for receiving an LED. One optical element may be employed to organize approximately one half of the light generated by the LED, with the remainder being permitted to radiate from the LED in its usual pattern.

17 Claims, 15 Drawing Sheets

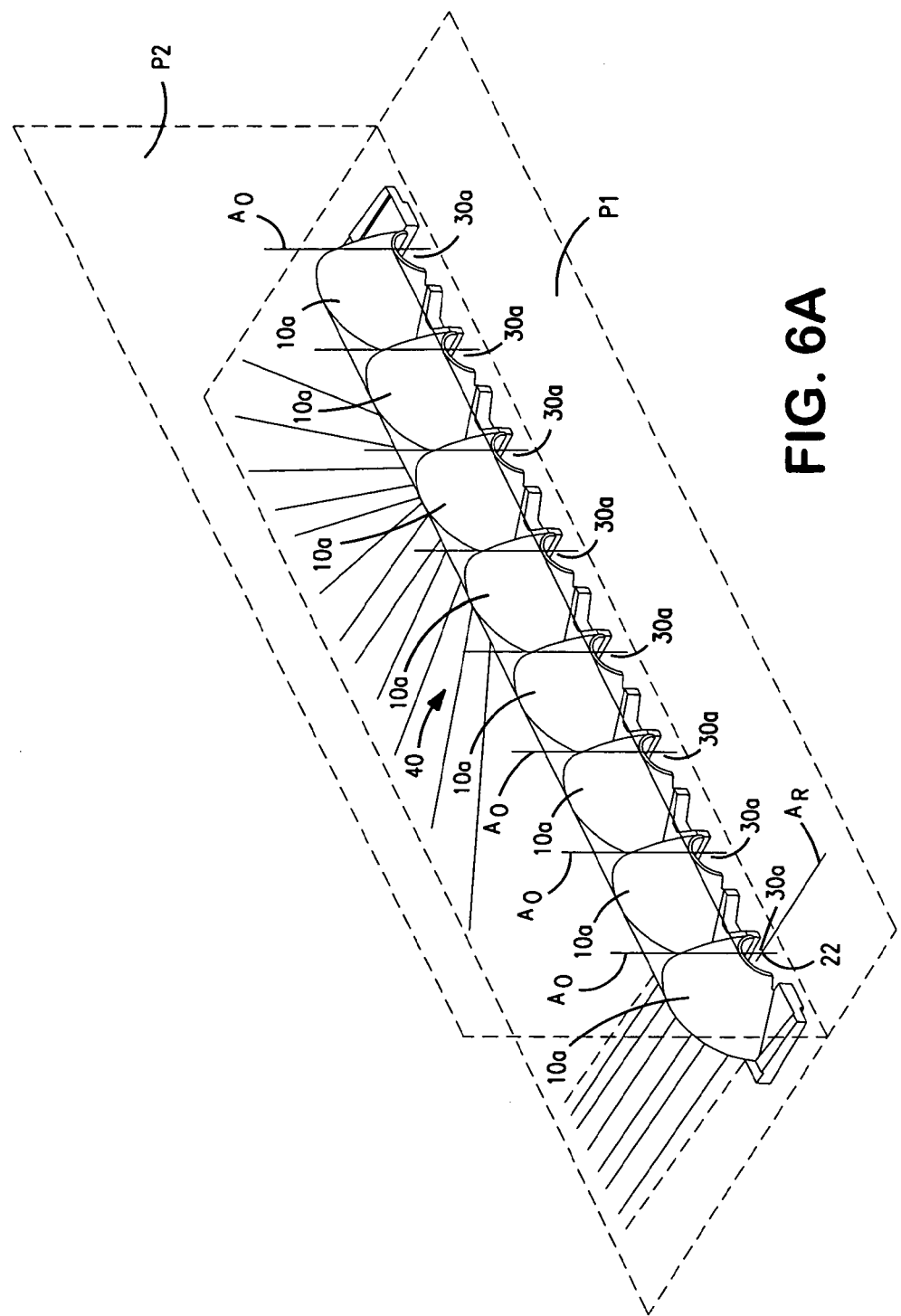

SIDE-EMITTING COLLIMATOR

This application is a continuation-in-part of U.S. patent application Ser. No. 10/878,846, now U.S. Pat. No. 7,083,313, filed Jun. 28, 2004.

BACKGROUND OF THE INVENTION

1. Field of the Invention

The present invention relates generally to lenses for distributing light from a light source and more particularly to a lens for changing the effective direction of light emission for all or a portion of the light generated by a light source.

2. Description of the Related Art

The use of LED's in warning and signaling lights is well known. Older models of LED's produced limited quantities of light over a relatively narrow viewing angle centered on an optical axis of the LED. These LED's were typically massed in compact arrays to fill the given illuminated area and provide the necessary light output. More recently developed, high output LED's produce significantly greater luminous flux per component, permitting fewer LED's to produce the luminous flux required for many warning and signaling applications. It is known to arrange a small number of high-output LED's in a light fixture and provide each high-output LED with an internally reflecting collimating lens. The collimating lens organizes light from the LED into a collimated beam centered on the LED optical axis. Such an arrangement typically does not fill the light fixture, resulting in an undesirable appearance consisting of bright spots arranged against an unlit background. Light-spreading optical features on the outside lens/cover are sometimes employed to improve the appearance of the light fixture.

FIG. 1 illustrates a prior art collimator of a configuration frequently employed in conjunction with LED light sources. Light from an LED positioned in a cavity defined by the collimator is organized into a collimated beam aligned with the optical axis of the LED. The known internally reflecting collimator for an LED is a molded solid of light transmissive plastic such as acrylic or polycarbonate. The radial periphery of the collimator is defined by an aspheric internal reflecting surface flaring upwardly and outwardly to a substantially planar light emission surface. The bottom of the collimator includes a cavity centered over the LED optical axis. The cavity is defined by a substantially cylindrical side-wall and an aspheric upper surface. The aspheric upper surface is configured to refract light emitted at small angles relative to the LED optical axis to a direction parallel with the LED optical axis. The shape of the aspheric upper surface is calculated from the refractive properties of the air/solid interface, the position of the LED point of light emission relative to the surface and the desired direction of light emission, e.g., parallel to the LED optical axis. The mathematical relationship between the angle of incidence of a light ray to a surface and the angle of the refracted ray to the surface is governed by Snell's Law: "The refracted ray lies in the plane of incidence, and the sine of the angle of refraction bears a constant ratio to the sine of the angle of incidence." ($\sin \theta / \sin \theta' =$ constant, where $\theta$ is the angle of incidence and $\theta'$ is the angle of refraction)

To allow the collimator of FIG. 1 to be easily extracted from a mold, the substantially cylindrical side-wall of the cavity is typically canted at an angle of between 1° and 3° relative to the central axis of the collimator. The cavity is narrower at the top where the side-wall joins the aspheric upper surface than at the bottom of the collimator. For any particular point on the substantially cylindrical side-wall, the path of light refracted into the collimator can be calculated using Snell's law. The shape of the peripheral aspheric internal reflecting surface is calculated from the path of light refracted by the substantially cylindrical side-wall surface and the desired direction of light emission, e.g., parallel to the LED optical axis. The resulting aspheric internal reflecting surface redirects light incident upon it in a direction parallel to the optical axis of the LED.

The result is that substantially all of the light emitted from the LED is redirected parallel to the optical axis of the LED to form a collimated beam. This arrangement efficiently gathers light from the LED and redirects that light into a direction of intended light emission. Unless the light is somehow spread, the light from each LED appears to the viewer as a bright spot the size and shape of the collimator.

SUMMARY OF THE INVENTION

Briefly stated, an embodiment of a side-emitting collimator comprises a pair of optical elements configured to form a cavity defined by light entry surfaces. The optical elements are positioned over a light source so that approximately one half of the light generated by the light source passes through the light entry surface into each optical element. Each optical element is configured and positioned to organize the received light into a collimated beam having an orientation substantially perpendicular to the optical axis of the light source. When combined into a side-emitting collimator unit, the optical elements redirect the light from an LED into diametrically opposed collimated beams perpendicular to the optical axis of the light source.

Each optical element/half of an embodiment of the side-emitting collimator includes an internal reflecting surface, a light entry surface (a portion of which is aspheric) and a light emission surface. As used in this application, the term "aspheric" means "not spherical". The internal reflecting surface, light entry surface and light emission surface can be described as "surfaces of revolution". The surfaces are the product of rotating a two dimensional longitudinal cross-section of the optical element approximately 180° about an axis.

The light entry surface of each optical element defines one half of a cavity that receives the light source. A first portion of the light entry surface is configured to cooperate with the peripheral internal reflecting surface to redirect light from the light source into a substantially collimated beam perpendicular to the optical axis of the light source. A second portion of the light entry surface is configured to redirect light to pass through the light emission surface as a substantially collimated beam perpendicular to the optical axis of the light source.

Some of the surfaces may be projected along a line to combine individual optical elements into a trough-like element. The resulting optical element will organize light from a row of light sources into planes perpendicular to the optical axes of the light sources, rather than beams, where light from the light sources will retain its angular orientation (within the planes) relative to the row of light sources. A partially collimated, or wide angle light pattern is produced.

These surface shapes and relationships shown and described herein are examples of surfaces that efficiently gather light from an LED/light source and re-direct that light into a pair of opposed collimated beams perpendicular to the optical axis of the LED. The invention should not be construed as being limited to the particular disclosed surface shapes.

BRIEF DESCRIPTION OF THE DRAWINGS

FIG. 6A is a perspective view of the row of optical elements of FIG. 6, modified according to aspects of the present invention;

DETAILED DESCRIPTION OF THE PREFERRED EMBODIMENT

Figure 2:
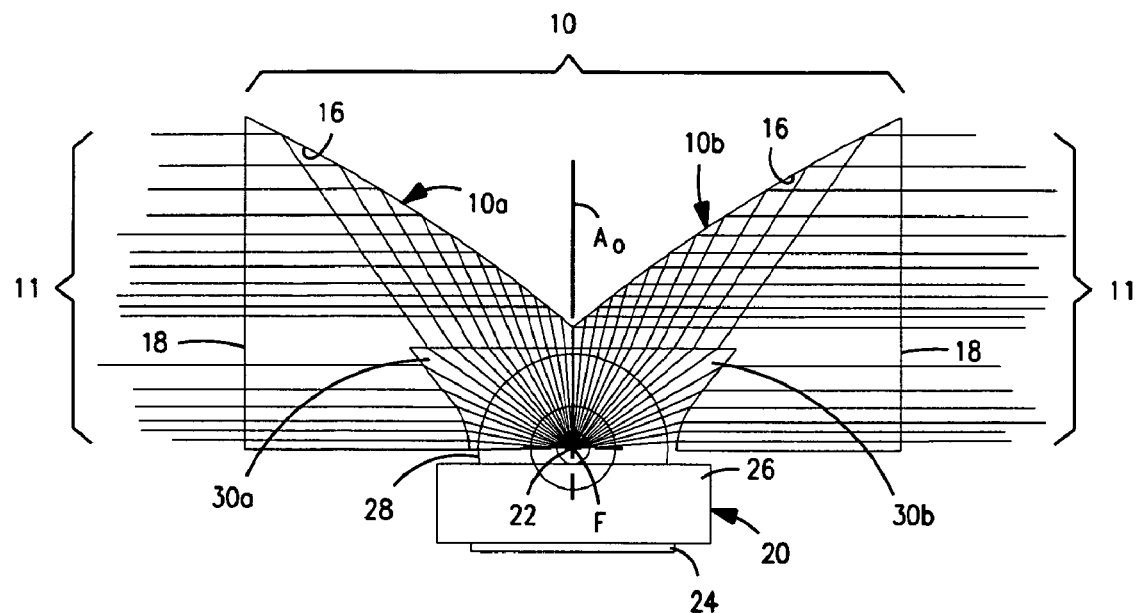
FIG. 2 is a sectional view through an embodiment of a side-emitting collimator in functional conjunction with an LED according to aspects of the present invention.
Figure 1:
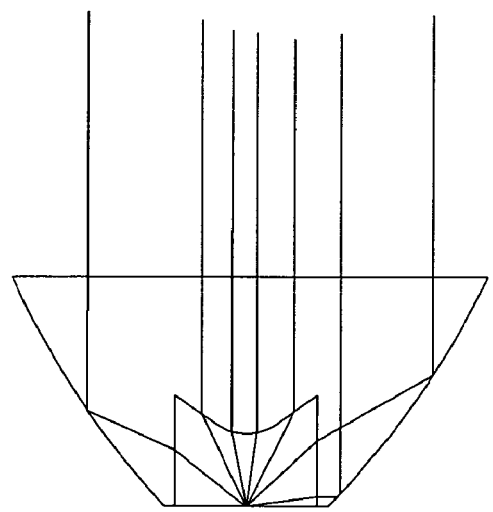
FIG. 1 is a side sectional view of a prior art collimator.

Exemplary optical elements and illumination configurations will now be described with reference to FIGS. 2-6A. FIG. 2 shows an exemplary side emitting collimator 10 in conjunction with an LED light source 20 to form an illumination configuration. The side-emitting collimator 10 organizes light from the LED 20 into a pair of oppositely directed, semi-circular collimated beams 11 perpendicular to the optical axis $A_O$ of the LED 20. The LED 20 includes a base 26 above a heat-transmissive slug 24. A lens 28 extends upwardly from the base 26. The LED lens 28 surrounds a point of light emission 22. The point of light emission 22 in an LED 20 is defined by a semi-conductor chip (not shown) which emits light when energized by an electrical current. The illustrated LED lens 28 is of the high-dome or "lambertian" shape. An LED with this lens shape emits light in a half dome surrounding the optical axis $A_O$ of the LED. The side-emitting collimator 10 is constructed about a focal point F that preferably coincides with the point of light emission 22 of the LED 20. The left and right portions 10a, 10b of the side-emitting collimator 10 are identical optical elements. Each half 10a, 10b of the side-emitting collimator is an optical element molded from optical-grade plastic, such as acrylic or polycarbonate. Other forming methods and materials may also be compatible with the present invention.

Figure 3:
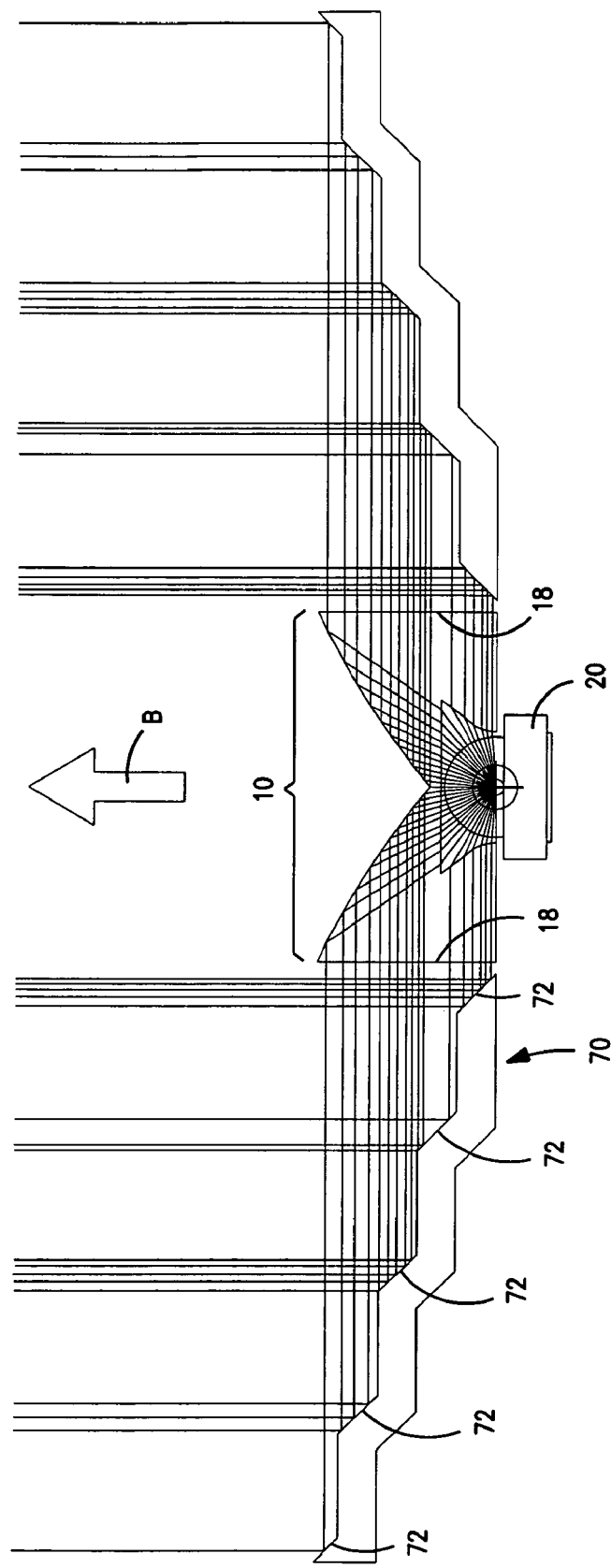
FIG. 3 is a sectional view of the side-emitting collimator and LED of FIG. 2 in conjunction with a reflector according to aspects of the present invention.
Figure 4:
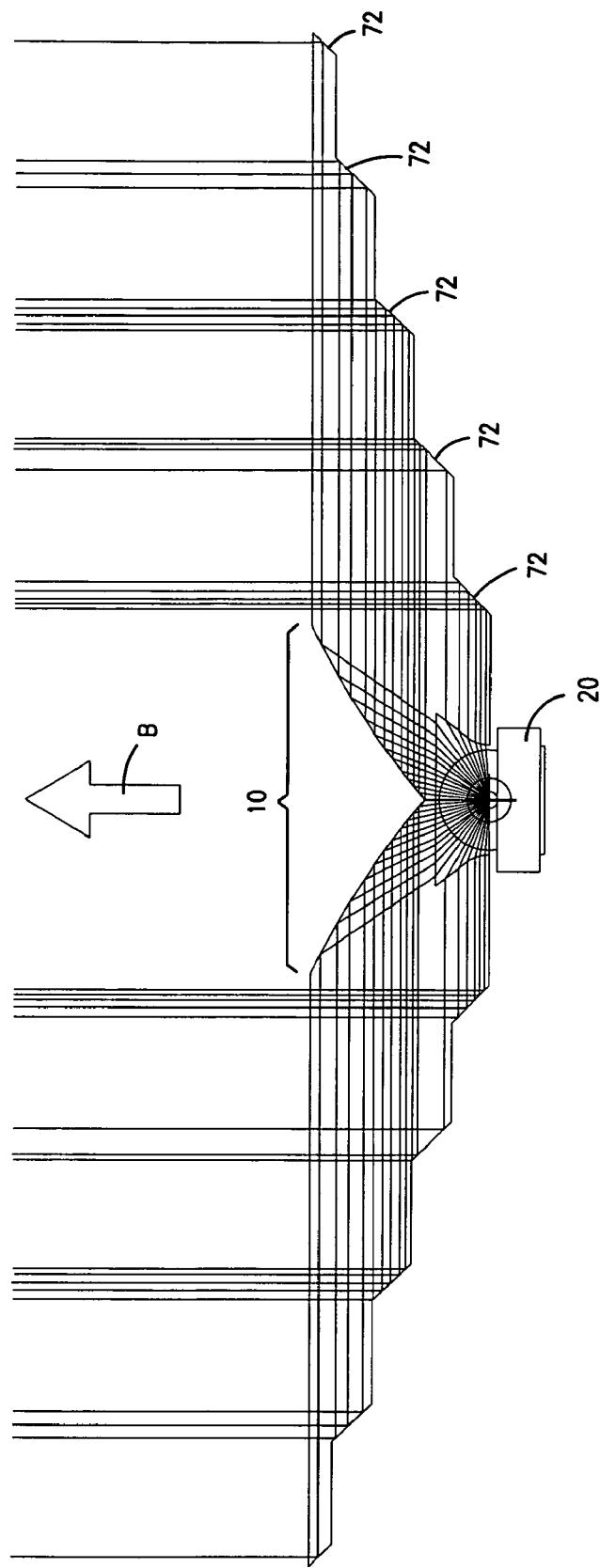
FIG. 4 is a sectional view through an alternative embodiment of a side-emitting collimator incorporated into an internally reflecting lens in functional conjunction with an LED according to aspects of the present invention.
Figure 8:
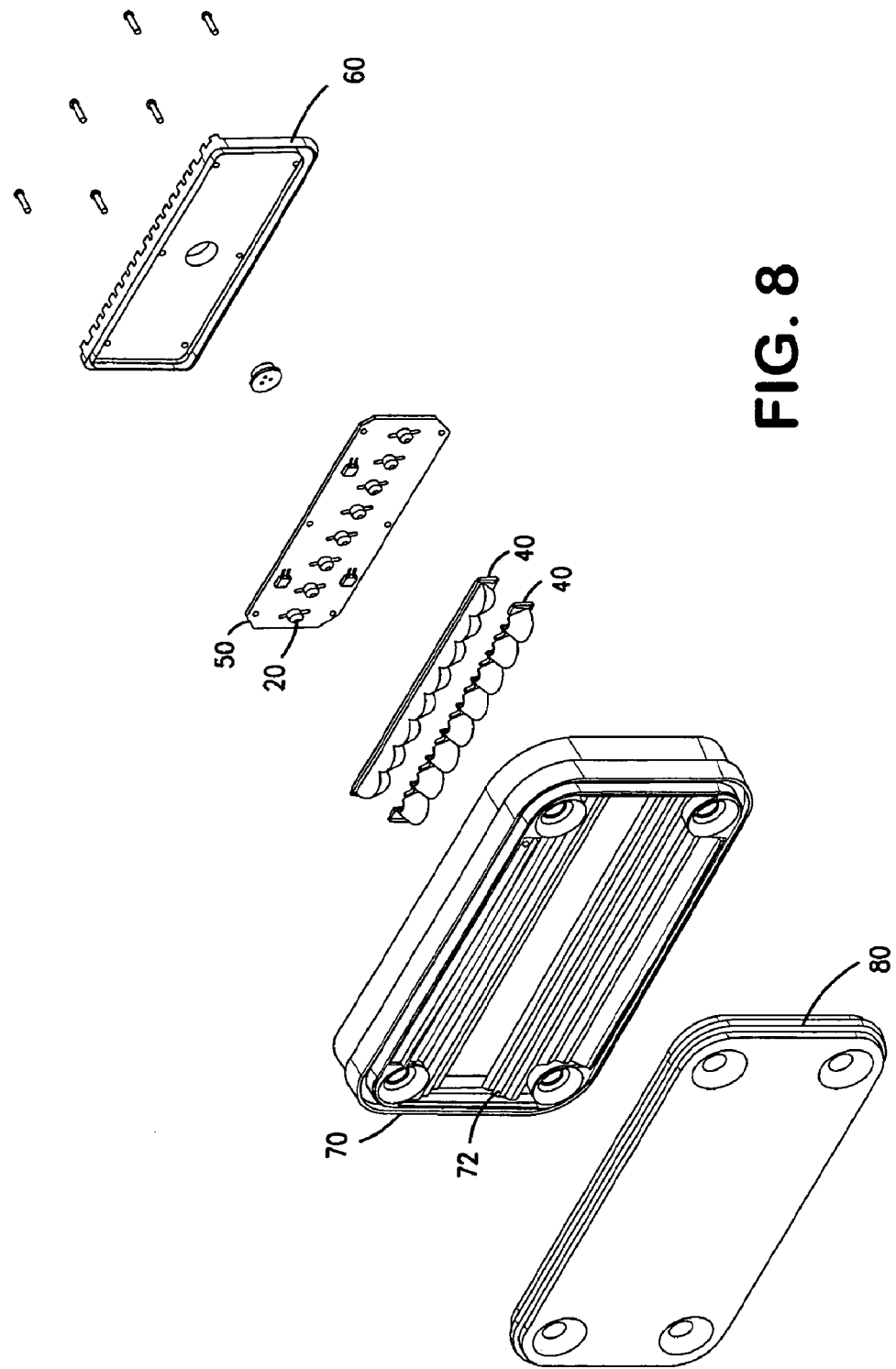
FIG. 8 is an exploded perspective view of a light assembly incorporating two rows of optical elements as shown in FIG. 6.
Figure 9:
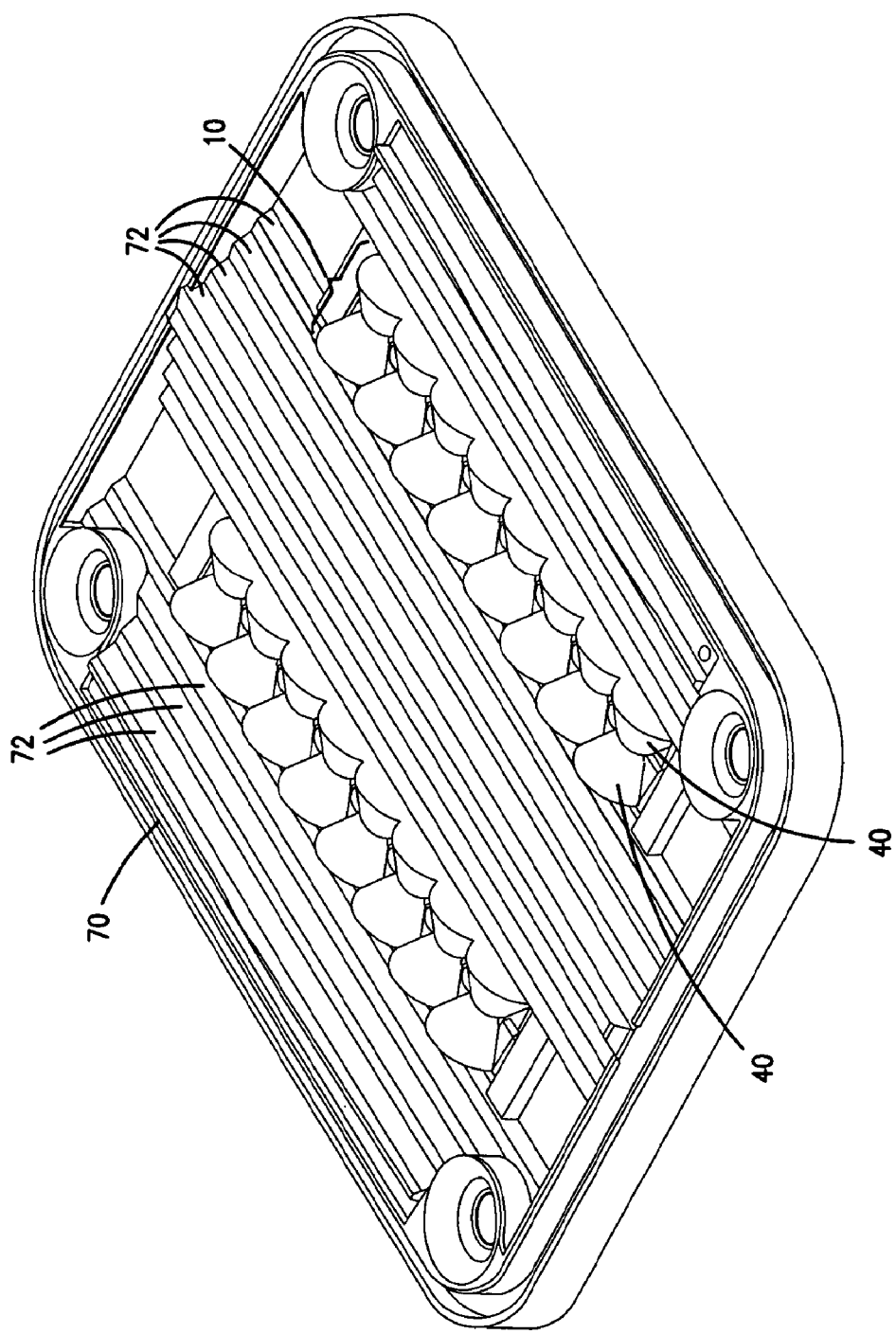
FIG. 9 is a perspective, partially assembled view of the light assembly of FIG. 7.

FIGS. 3 and 4 are sectional views of illumination configurations employing side-emitting collimators 10 according to aspects of the present invention. In the assembly of FIG. 3, angled reflecting surfaces 72 redirect the collimated beams after they emerge from the light emission surfaces 18 of the side-emitting collimator 10. The angled reflecting surfaces 72 are laterally spaced from the LED and from each other. Each reflecting surface is configured to each intercept a portion of the collimated beam from each side-emitting collimator 10. This arrangement distributes light from each LED 20 over a large area in a direction of light emission B for the light assembly. The reflecting surfaces 72 are also shown in FIGS. 8 and 9.

FIG. 4 is an alternative embodiment where the side-emitting collimator 10 is incorporated into a larger internally reflecting lens. The reflecting surfaces 72 shown in FIG. 4 are internal reflecting surfaces.

In the illustrated embodiments, the reflecting surfaces 72 are substantially planar, extend the length of the light assembly and are laterally equidistantly spaced. The reflecting surfaces 72 are oriented at an angle of approximately 45° relative to the optical axes $A_O$ of the LEDs 20. The shape, height, length, lateral spacing, and angular orientation of the reflecting surfaces may be selected to produce a particular desired pattern of light distribution. For example, reflecting surfaces that are convex when viewed in section (not shown) would increase the lateral spread of the light pattern for the assembly.

Figure 5:
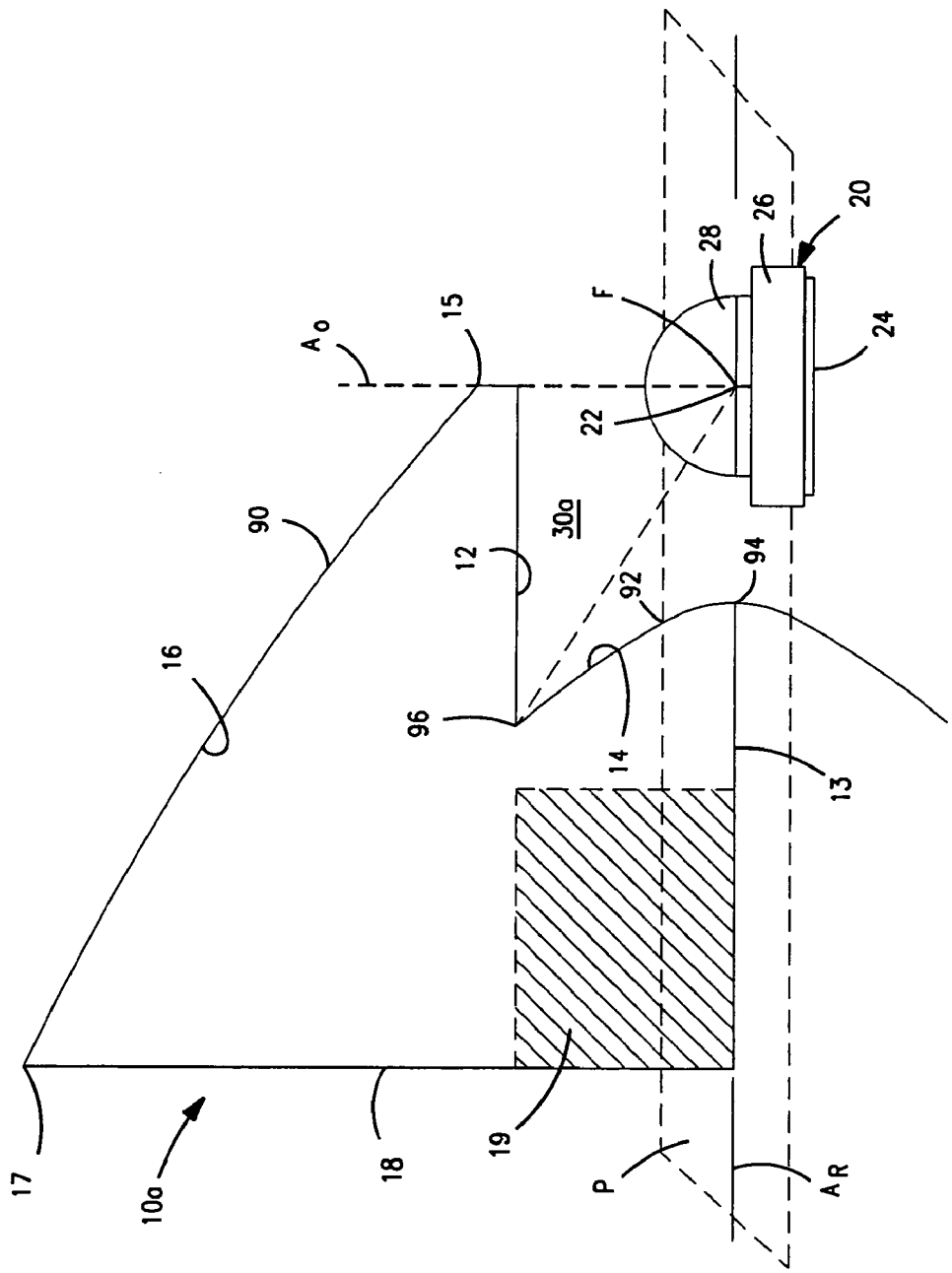
FIG. 5 is a side view of an exemplary illumination configuration.

FIG. 5 illustrates the geometrical relationships between an LED 20 and the light entry, internal reflecting and light emission surfaces of one half 10a of an exemplary side-emitting collimator 10. Each half 10a, 10b, may also be referred to as "an optical element". Each half 10a, 10b of the side-emitting collimator 10 includes an upper surface 16 produced by rotating a non-circular curve 90 approximately 180° about an axis of rotation $A_R$ that extends beneath both halves 10a, 10b of the collimator 10. The axis of rotation $A_R$ preferably passes through the focus F and point of light emission 22 of the LED. The shape of the curve 90 rotated about axis $A_R$ is calculated to produce an internal reflecting surface that will reflect light entering the optical element by way of portion 12 of the light entry surface into a path desired for the collimated beam. The path of light gathered by the light entry surface portion 12 in the collimator can be calculated from the known values of: the shape of the light entry surface 12; the angle of light incident upon the light entry surface 12; and the refractive properties of the optical element material (acrylic plastic)/air interface using Snell's Law.

These calculations produce a non-spherical, or aspheric internal reflecting surface 16. As used in this application, the term "aspheric" means "not spherical". The illustrated aspheric surfaces 14, 16 are created by rotating a non-circular curve 90, 92 approximately 180° about an axis of rotation $A_R$. The resulting aspheric surfaces can be described as partial "surfaces of revolution". As shown in FIG. 5, the non-circular curve 90 extends upwardly and outwardly from a first end 15 to a second end 17. When rotated approximately 180° about the axis of rotation $A_R$, the curve 90 defines the internal reflecting surface 16 of each collimator half 10a, 10b. The orientation of the components shown in FIG. 5, e.g., LED facing upward with optical element 10a arranged to produce a horizontal collimated beam, are for purposes of illustration. It will be understood that the disclosed illumination configurations may be mounted in any desired orientation without impairing their function.

The aspheric portion 14 of the light entry surface of each collimator half 10a, 10b is configured to refract a portion of the light generated by the LED 20 into a direction perpendicular to the optical axis $A_O$ of the LED. The shape of the non-circular curve 92 used to define the aspheric portion 14 of the light entry surface is calculated from the known values of: the angle of light incident upon the surface 14; the direction desired for light to emerge from the light emission surface 18, and the refractive properties of the collimator lens material (acrylic plastic)/air interface using Snell's Law. The non-circular curve 92 extends between an origin 94 on the axis of rotation $A_R$ to a terminus 96 where the curve 92 intersects with the substantially cylindrical portion 12 of the light entry surface 12. When rotated approximately 180° about the axis of rotation $A_R$, the curve defines the aspheric portion 14 of the light entry surface.

The optical element illustrated in FIG. 5 has a light entry surface with two distinct portions, a substantially cylindrical portion 12 radially separated from the axis of rotation $A_R$, and an aspheric portion 14 intersecting the axis of rotation $A_R$. The light emission surface 18 shown in FIG. 5 is a substantially planar surface. One alternative is to remove a cylindrical portion 19 of the optical element as shown in FIG. 5 to reduce the thickness of the optical element and the amount of optically transmissive material used. Such a configuration would result in a compound light emission surface, with each portion being substantially planar and parallel to a plane including the optical axes $A_O$ of the LEDs. The size and shape of the removed material may be influenced by practical limitations of the molding process or other design considerations.

The bottom surface 13 of each optical element 10a, 10b plays no part in the light organizing function of the collimator and serves a largely support function. The configuration of the bottom surface 13 is dictated by practical concerns such as accommodating the base 26 of the LED. The bottom surface is also configured to support the optical element 10a, 10b so that the light entry surface portions 12, 14 and internal reflecting surface 16 are in the desired relationship with the point of light emission 22 and optical axis $A_O$ of the light source/LED.

The phrase "partially defined by" is used to describe the optical element that forms each collimator half in terms of the light entry 12, 14, internal reflecting 16 and light emission 18 surfaces. It is acknowledged that these three surfaces, including their sub portions where appropriate, do not completely define the optical element, which also includes the bottom surface 13 as described above and is likely to include other features for mounting to other components of a light assembly.

Figure 5A:
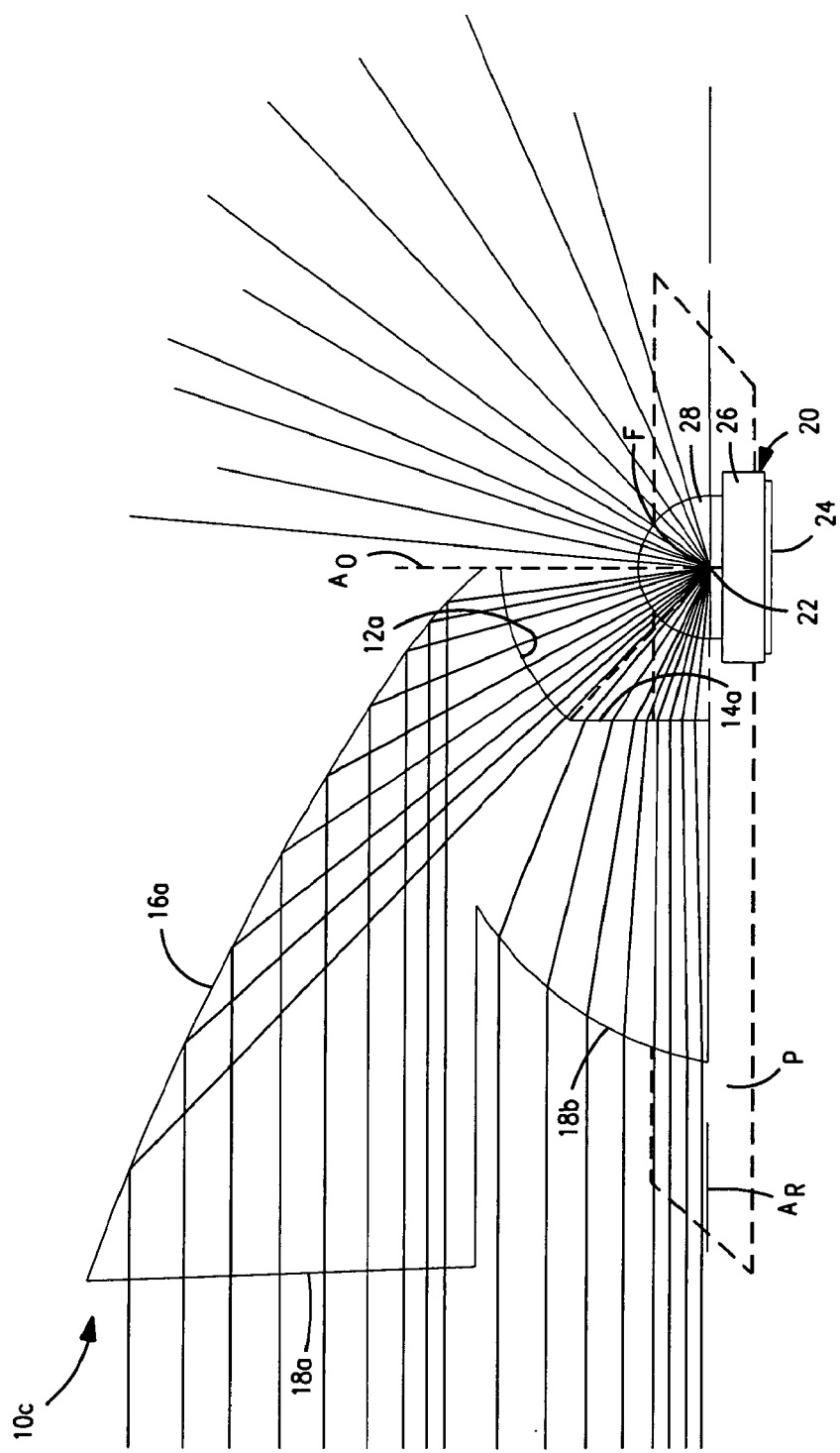
FIG. 5A is a side view of an alternative exemplary illumination configuration.

An alternative embodiment of a side emitting collimator optical element 10c is illustrated in FIG. 5A. This optical element 10c is partially defined by a light entry surface 12a, 14a, a light emission surface 18a, 18b and an internal reflecting surface 16a. The light entry surface 12a, 14a of this embodiment is configured as a concave spherical surface 12a where it receives light to be incident upon the internal reflecting surface 16a. The spherical surface is defined by a circular curve centered upon the point of light emission 22 of the LED 20. Light generated by the LED meets the spherical portion 12a of the light entry surface at a right angle to minimize or eliminate refraction at this surface. Since light entering the optical element 10c via the spherical portion 12a of the light entry surface is not refracted, the internal reflecting surface 16a can be configured as a parabolic surface, with the parabola having a focus coincident with the point of light emission 22 of the respective LED 20. Light entering the optical element 10c via the spherical component 12a of the light entry surface is reflected by the internal reflecting surface 16a into a direction substantially perpendicular to the optical axis of the respective LED 20.

A second component of the light entry surface is configured as a semicircular planar surface 14a arranged to receive wide-angle light from the LED 20. This wide-angle light meets the planar portion 14a of the light entry surface over a range of angles. The shape of the convex portion 18b of the light emission surface is calculated to refract light entering the optical element via the planar portion 14a of the light entry surface into a collimated beam substantially perpendicular to the optical axis $A_O$ of the LED 20. The convex portion 18b of the light emission surface is configured as an aspheric surface.

Each of the light entry 12a, 14a, light emission 18a, 18b and internal reflecting surfaces 16a of optical element 10c are partial surfaces of revolution. That is, they are defined by rotation of a two dimensional shape about an axis of rotation $A_R$ less than 360°. In the illumination configuration configured in FIG. 5A, the axis of rotation $A_R$ is substantially perpendicular to the optical axis $A_O$ of the respective LED 20. The illumination configuration of FIG. 5A is constructed to organize approximately one-half of the light generated by the LED 20 into a semi-circular collimated beam having a direction perpendicular to the optical axis $A_O$ of the LED. The remaining half of the light generated by the LED is allowed to radiate in its normal pattern. The illumination configuration of FIG. 5A may be employed in combination with other lenses or reflectors configured to redirect either the collimated beam from the optical element 10c or the divergent light from the other half of the LED, 10 or both. It will be understood that the illumination configuration of FIG. 5 will function in substantially the same manner as the configuration shown in FIG. 5A. The surface configurations illustrated in FIGS. 5 and 5A are by way of example. Other surface configurations may occur to those skilled in the art.

The illustrated collimator halves 10a, 10b are semi-circular in lateral section (perpendicular to the view of FIG. 5). A plane P includes the axis of rotation $A_R$ and the focus F of the collimator 10. Each half 10a, 10b of the side-emitting collimator defines one half 30a, 30b of a cavity 30 that receives the light source (LED 20). Light entry surface portions 12 meet over the optical axis $A_O$ of the LED light source to define the upper and longitudinal side surfaces of the cavity. The respective aspheric portions 14 of each optical element 10a, 10b define the lateral ends of the cavity 30. The substantially cylindrical light entry surface portions 12 are positioned to refract light from the light source onto the internal reflecting surfaces 16. The aspheric portions 14 refract a portion of the light from the light source into a direction parallel to light reflecting from the internal reflecting surface 16.

Each half 10a, 10b of the side-emitting collimator 10 defines one-half 30a, 30b of a cavity 30 surrounding the LED lens 28. The cavity portion 30a, 30b defined by each half 10a, 10b of the side-emitting collimator 10 is defined by two refracting surfaces 12, 14. The substantially cylindrical surface 12 is centered on focal point F and extends perpendicularly to the optical axis $A_O$ of the LED 20. Surface 12 is described as a "substantially cylindrical" surface because it is not perfectly cylindrical with respect to the axis of rotation $A_R$. In the illustrated embodiments, the substantially cylindrical surface 12 has a larger diameter at its open end (to the right in FIG. 5) than at the junction with the aspheric portion 14. This particular surface configuration is not necessary to the optical performance of the collimator 10.

Figure 6:
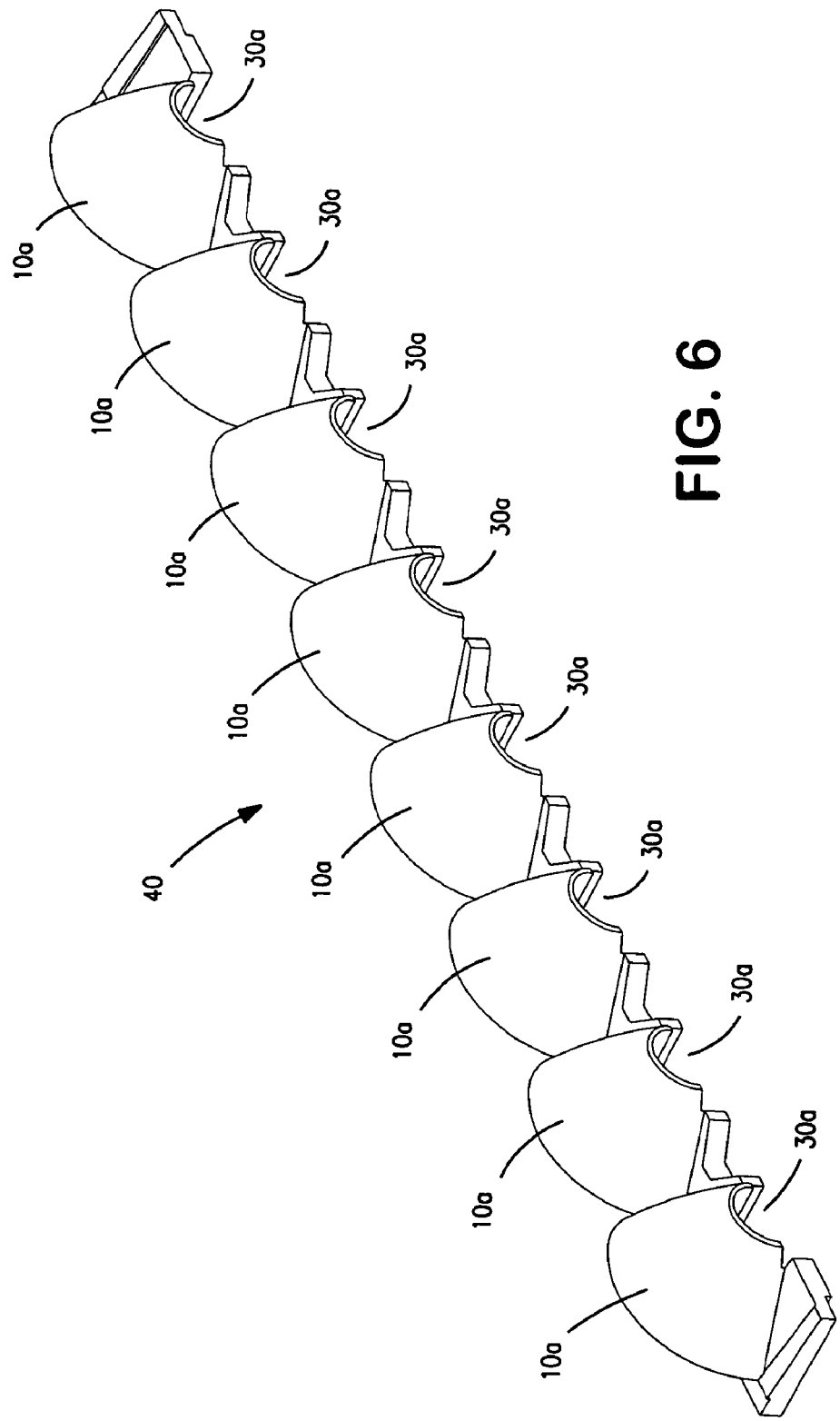
FIG. 6 is a perspective view of a row of optical elements according to aspects of the present invention.

There are many ways to form the lens shapes employed in the side-emitting collimator 10. One preferred method is to mold the lenses from clear plastic. FIG. 6 illustrates an exemplary configuration where a row 40 of side-emitting collimator halves 10a are molded from optically is clear acrylic plastic having an index of refraction of approximately 1.491 at a wavelength of 550 nm. A mirror image row 40 of side-emitting collimator halves arranged as shown in FIG. 9 produces eight side-emitting collimators 10 for organizing the light from a row of eight LEDs 20. Alternatively, the two rows of side-emitting collimators may be molded as a single unit (not shown).

FIGS. 7-10 illustrate exemplary light assemblies incorporating rows 40 of side-emitting collimators 10 over corresponding rows of LEDs 20 according to aspects of the present invention. A molded plastic reflector 70 provides structural support for the assemblies. PC boards 50 include a linear array of eight LED's 20. Two rows 40 of side-emitting collimator halves 10a, 10b are arranged with their respective cavity ends aligned over the row of LEDs to form side-emitting collimators 10 over each LED. The PC boards and rows of collimator-halves are clamped against the back of the reflector 70 by heat sinks 60 corresponding to the configuration of the PC boards 50. The illustrated heat sinks 60 are molded from heat-transmissive plastic to disperse heat generated by the LED's 20. A lens 80 protects the assembly and also may be provided with refracting features for spreading light coming off the parallel reflecting surfaces 72.

FIG. 8 illustrates a light assembly employing a single PC board 50, heat sink 60 and row of side-emitting collimators 10 constructed from two rows 40 of collimator halves 10a, 10b. The heat sink 60, reflector 70 and lens 80 of FIG. 8 function in the same manner as the corresponding components of FIG. 7. FIG. 3 illustrates the relative positions of the LED 20, side-emitting collimator 10 and reflecting surfaces 72 of the light assembly shown in FIG. 8. These relationships organize light from the row of LED's 20 so that it is emitted substantially evenly over the area of the light assembly. The inventive side-emitting collimator 10 and reflector efficiently distributes the light from the LEDs to improve the aesthetic appearance of the light radiation pattern without impairing compliance with relevant standards for warning and signal light pattern and intensity.

Figure 7:
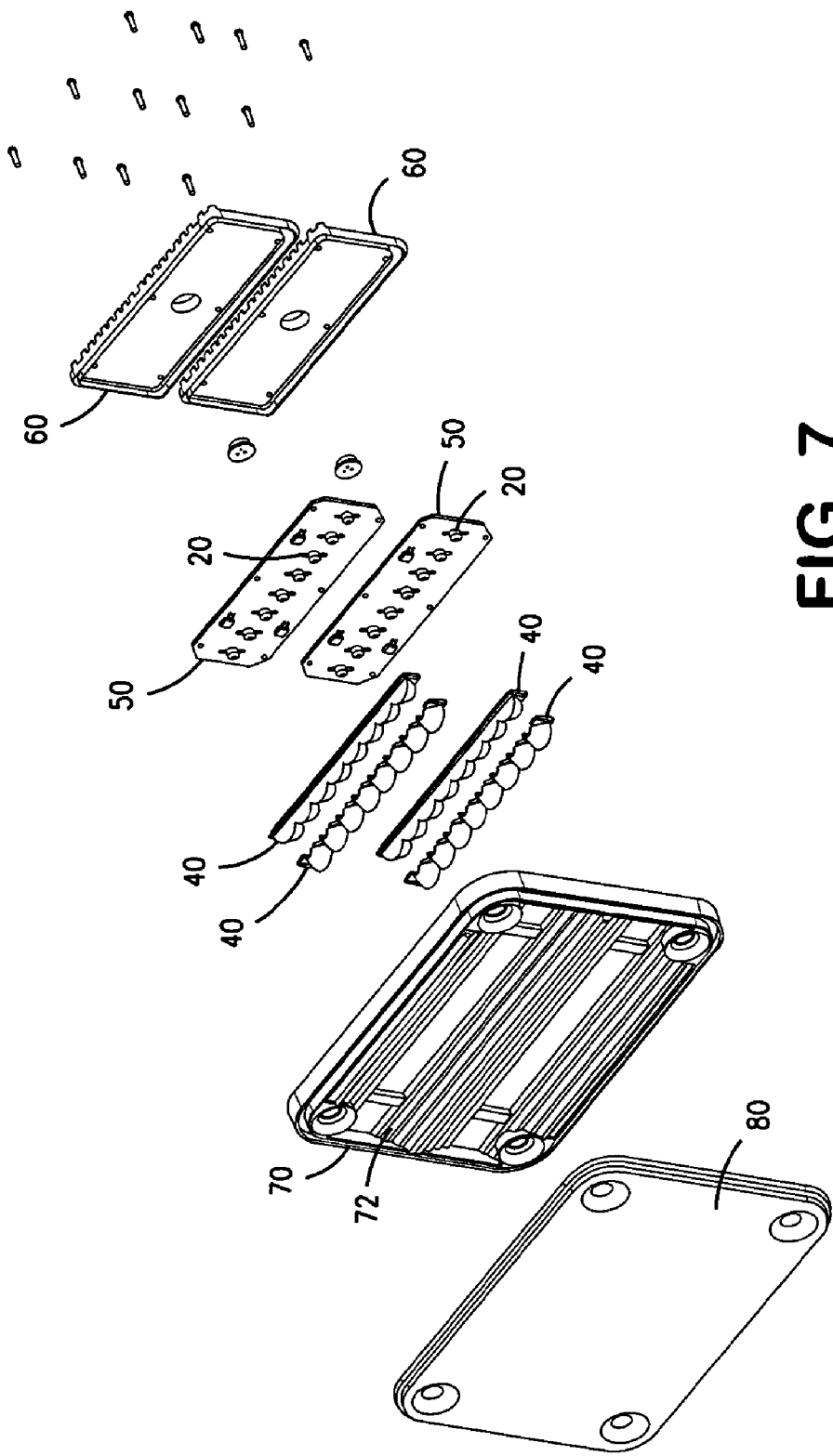
FIG. 7 is an exploded perspective view of a light assembly incorporating four rows of optical elements as shown in FIG. 6.
Figure 10:
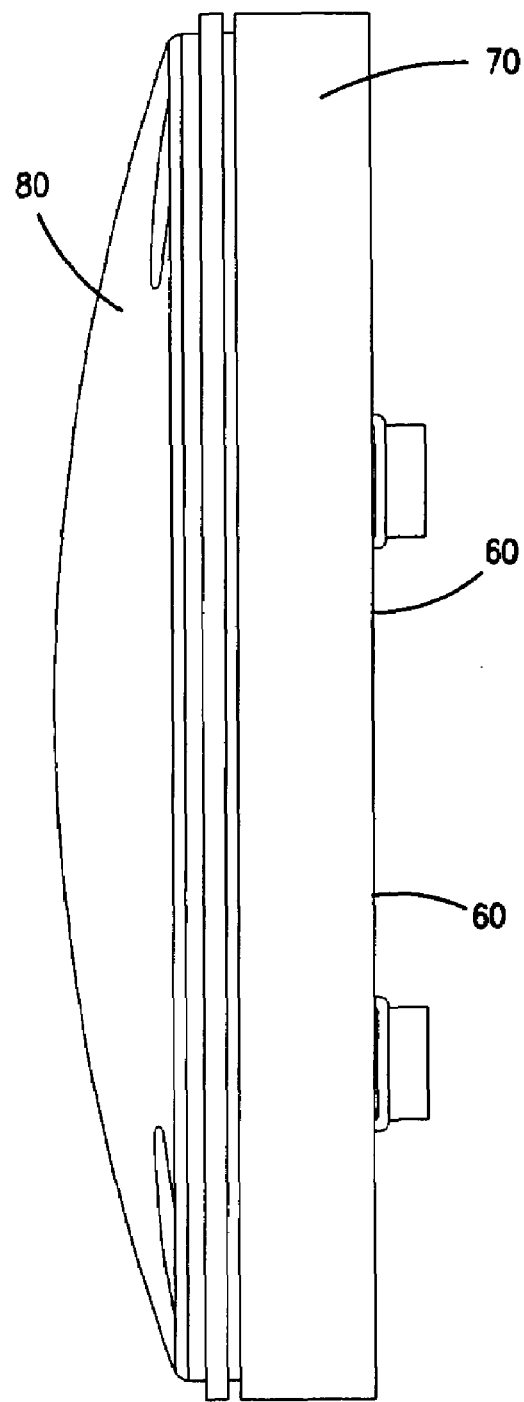
FIG. 10 is a side view assembled view of the light assembly of FIG. 7.

FIG. 9 is a top perspective view of the reflector of FIG. 7 in functional conjunction with the rows 40 of collimator halves 10a, 10b. The opposed collimated beams from each side-emitting collimator 10 are incident upon five parallel reflecting surfaces 72 extending along either side of each row of LEDs. This configuration effectively spreads the light over the surface area of the reflector 70. FIG. 10 is a side view of the assembled components shown in FIG. 7. An advantage of the illustrated light assembly configuration is an extremely low profile as shown in FIG. 10. This low profile permits a light assembly according to the present invention to be mounted on the exterior of a vehicle without requiring a large cutout to accommodate a deep reflector. The rear surface of the heat sinks 60 will have a large surface contact with what will typically be the metal skin of the emergency vehicle. This large surface contact will enhance heat transfer away from the LEDs of the light assembly.

Figure 11:
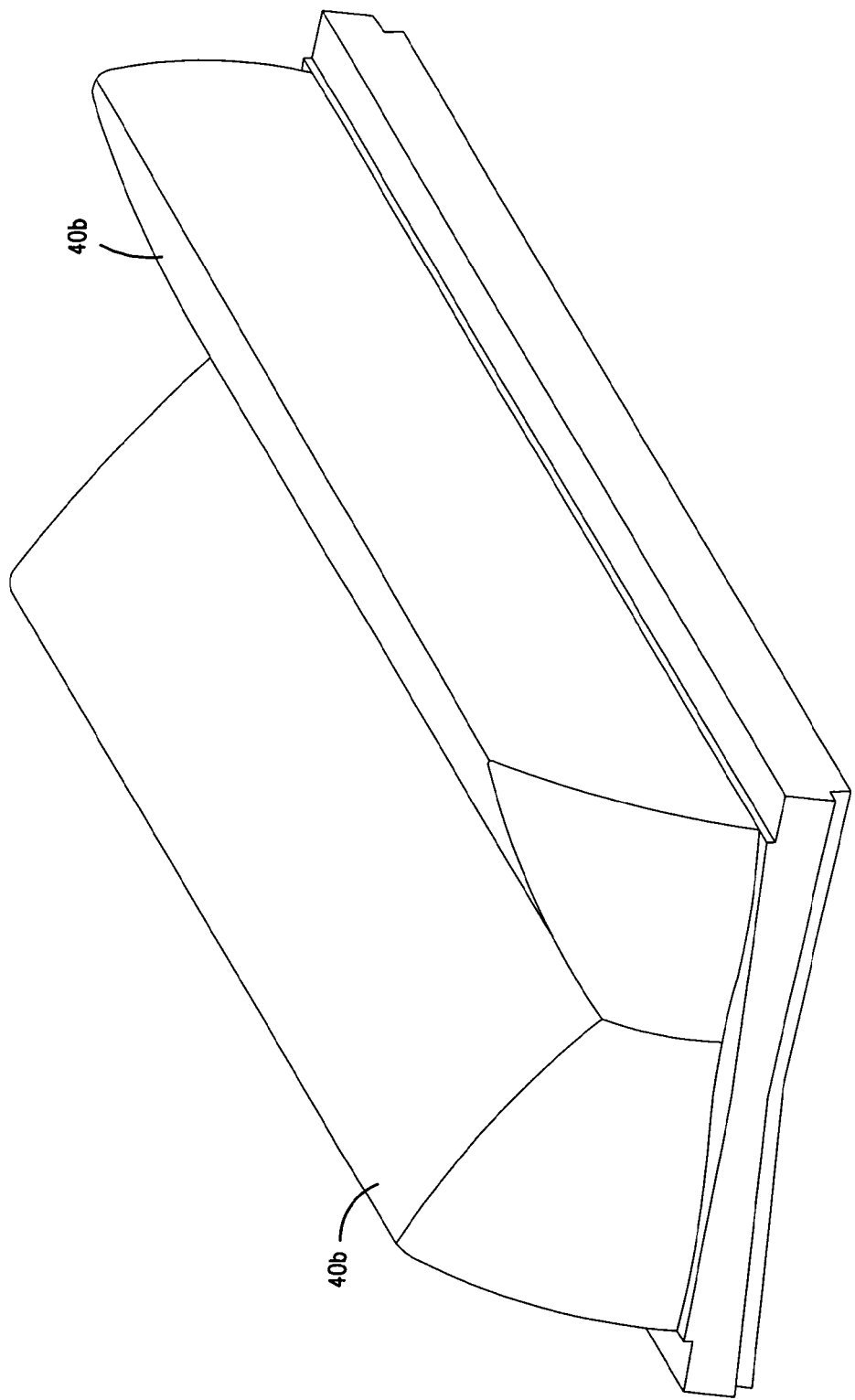
FIG. 11 is a perspective view of alternative optical elements combined to form rows.
Figure 12:
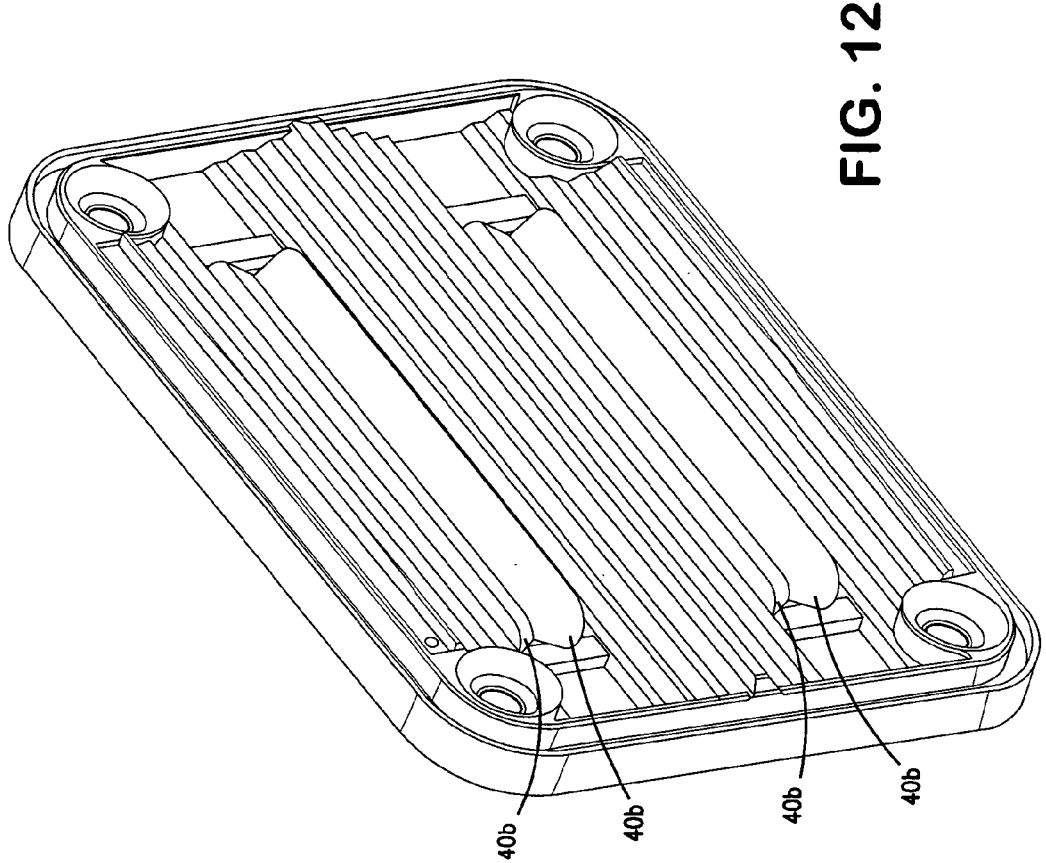
FIG. 12 is a perspective view of a light assembly incorporating the optical elements of FIG. 11.

An alternative embodiment of the side emitting collimator rows are shown in FIGS. 6A and 11 and 12. FIG. 6A illustrates an optional configuration in which the individual internal reflecting surfaces 16 of each collimator half 10a are replaced with a longitudinally extending trough-like surface extending the length of the collimator row 40. This collimator row configuration may be described as a side emitting trough collimator. The internal reflecting surface is defined by a portion of an aspheric curve projected along a line to form a linear internal reflecting surface. The longitudinal end portions of the linear internal reflecting surface are defined by rotating the portion of the aspheric curve approximately 90° about an axis of rotation $A_R$. The axis of rotation $A_R$ is perpendicular to the optical axis of the LED at the end of the row and passes through the point of light emission of this LED. The trough side emitting collimator organizes light from a row of LEDs into a direction coincident with planes P1 perpendicular to a plane P2 containing the optical axes $A_O$ of the LEDs in the row. This can be contrasted with the configuration illustrated in FIG. 6, where the individual internal reflecting surfaces 16 of the optical elements 10a organize one half the light from each LED into a collimated beam having a direction perpendicular to the optical axis $A_O$ of the respective LED. Blending the individual optical elements 10a into a trough allows light from each LED to retain an angular trajectory within the planes P1 as shown in FIG. 6A.

The effect is that of a wide-angle band of light in a plane perpendicular to a plane P2 including the optical axes $A_O$ of the LEDs. In other words, the trough collimator configuration will redirect light from the LEDs into planes P1 perpendicular to the plane P2 including the optical axes of the LEDs, but some of that light will have an angular orientation that is not perpendicular to the length of the row of LEDs. This configuration of collimator may be particularly useful in illumination configurations where a wide-angle light radiation pattern is desired.

The trough collimator may be produced employing the side emitting collimator shape illustrated in FIGS. 5 or FIG. 5A. The convex portion 18a of the light emission surface may be retained in its discrete configuration or the aspheric curve may be projected along a line and rotated at the longitudinal ends of the assembly to provide a wide angle or band collimating effect as previously described.

Figure 13:
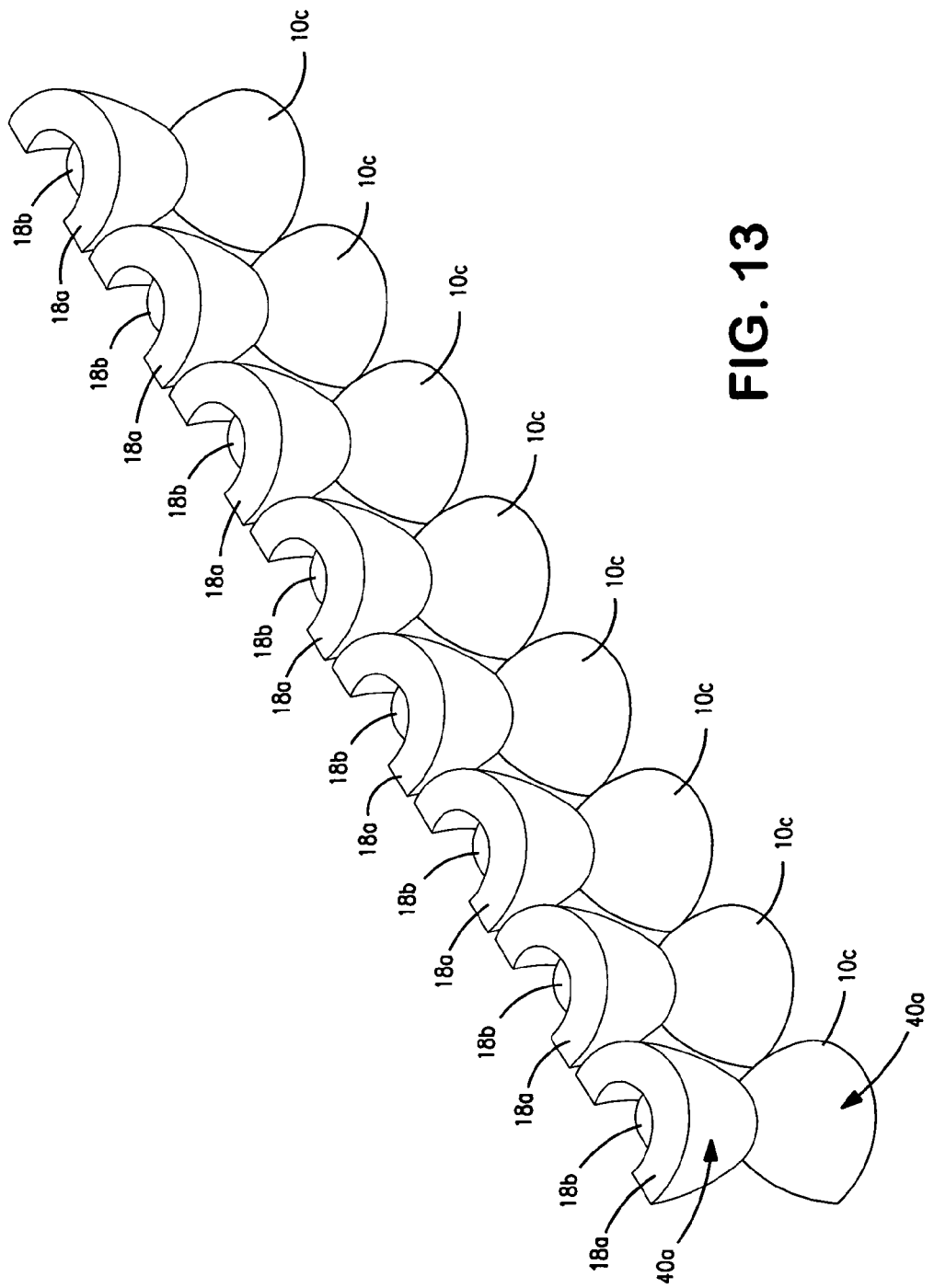
FIG. 13 is a perspective view of rows of the optical element illustrated in FIG. 5A.
Figure 14:
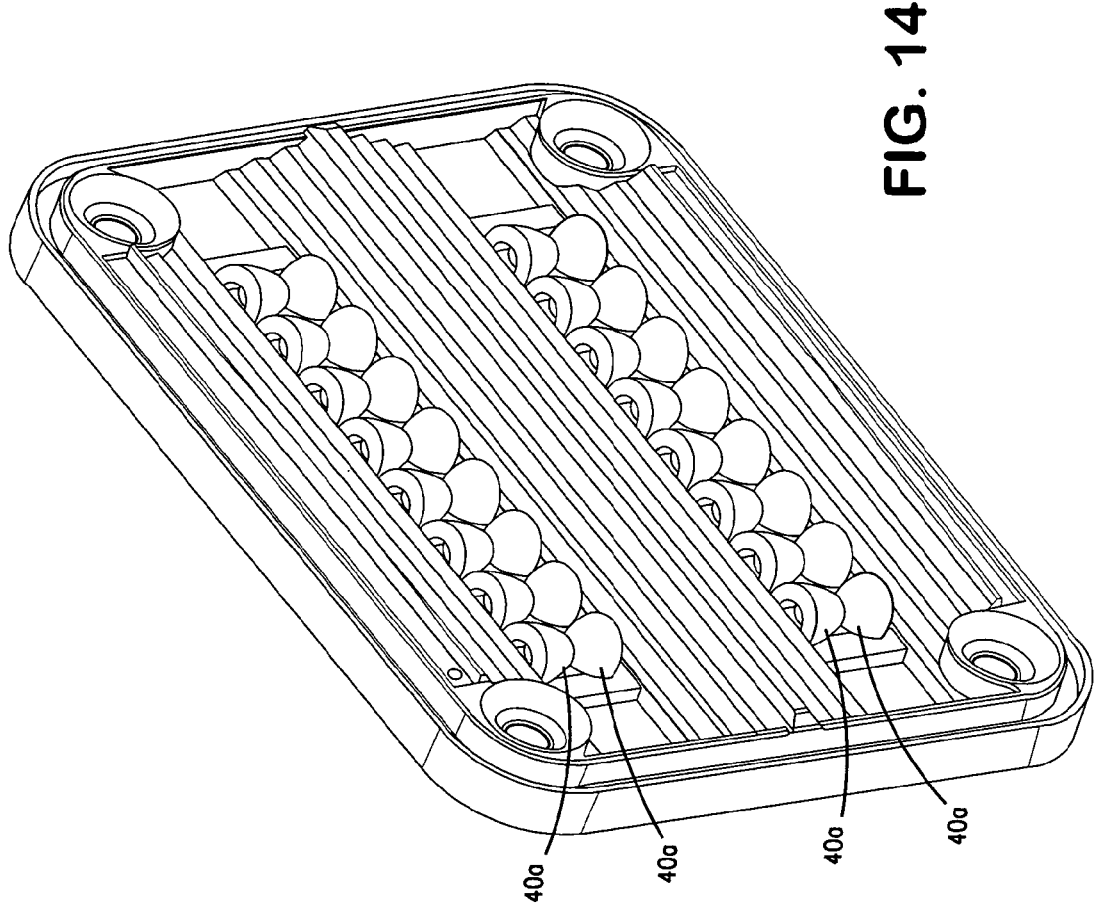
FIG. 14 is a perspective view of a light assembly incorporating the rows of optical elements illustrated in FIG. 13.

FIGS. 13 and 14 illustrate side emitting collimator rows of discrete side emitting collimators employing the collimator configuration of FIG. 5A. The optical elements 10c will behave individually as described with respect to the side emitting collimator of FIG. 5A.

While exemplary embodiments of the foregoing invention have been set forth for purposes of illustration, the foregoing description should not be deemed a limitation of the invention herein. Accordingly, various modifications, adaptations and alternatives may occur to one of skill in the art without departing from the spirit and the scope of the present invention.

What is claimed is:

1. An illumination configuration comprising:
    an optical element including a light entry surface, a light emission surface and an internal reflecting surface defined by a two dimensional shape rotated approximately 180° about an axis of rotation passing through at least a portion of said light entry and light emission surfaces, said internal reflecting surface being radially spaced from said axis of rotation; and
    a light source having a radiation pattern distributed symmetrically about an optical axis, said light source positioned adjacent said light entry surface with said optical axis perpendicular to said rotational axis.

2. The illumination configuration of claim 1, wherein said light source is a light emitting diode.

3. The illumination configuration of claim 1, wherein said light entry surface defines a cavity and said light source is partially disposed in said cavity.

4. The illumination configuration of claim 1, wherein said light entry surface is at least partially spherical.

5. The illumination configuration of claim 1, wherein said internal reflecting surface is part of a paraboloid.

6. The illumination configuration of claim 1, wherein a first portion of the light from said light source passing through said light entry surface is incident upon and redirected by said internal reflecting surface to pass through said light emission surface and a second portion of light passing through said light entry surface is refracted by said optical element to pass through said light emission surface.

7. The illumination configuration of claim 6, wherein said first and second portions of light passing through said light entry surface represent approximately one half of the light generated by said light source.

8. The illumination configuration of claim 1, wherein approximately one half of the light generated by said light source is incident upon said light entry surface and is collimated into a direction substantially perpendicular to the optical axis of said light source.

9. The illumination configuration of claim 1, wherein light passing through said light entry surface is organized into a collimated beam substantially perpendicular to the optical axis of the light source.

10. The illumination configuration of claim 1, wherein said light entry surface has two portions, one portion being a substantially cylindrical portion radially separated from said axis of rotation and a second portion being an aspheric portion intersecting the axis of rotation, and said light emission surface is a compound surface having two light emissions portions, each light emission portion being substantially planar and parallel to a plane including the optical axis, one light emission portion being spaced farther from said axis of rotation than the other, with the light emission portion spaced farther from said axis of rotation being spaced farther from said optical axis than the other light emission portion.

11. An illumination configuration comprising:
a plurality of LEDs arranged in a row, each said LED having a radiation pattern originating from a point source, said radiation pattern symmetrically distributed about an optical axis of each LED, said optical axis passing through said point source; and
an optical element configured to organize light from said row of LEDs, said optical element comprising:
a longitudinally extending solid of optically transmissive material partially defined by:
a light entry surface arranged to receive a portion of the light generated by each of the LEDs;
a light emission surface; and
an internal reflecting surface defined by a portion of a parabola projected along a line,
a first portion of the light passing through said light entry surface is incident upon and redirected by said internal reflecting surface to pass through said light emission surface and a second portion of light passing through said light entry surface is refracted by said optical element to pass through said light emission surface, substantially all the light passing through said light emission surface being directed in a plane substantially perpendicular to a plane including the optical axes of the LEDs.

12. The illumination configuration of claim 11, wherein said light emission surface includes a convex region configured to refract said second portion of light.

13. The illumination configuration of claim 11, wherein at least a portion of said light entry surface is defined by a spherical curve.

14. The illumination configuration of claim 11, wherein said solid has longitudinal ends, said internal reflecting surface adjacent said ends defined by said portion of a parabola rotated approximately 90° about a line substantially perpendicular to the optical axis and passing through the point of light emission of an LED at each end of the row.

15. An illumination configuration comprising:
a plurality of LEDs arranged in a row, each said LED having a radiation pattern originating from a point source, said radiation pattern symmetrically distributed about an optical axis of each LED; and
a solid of optically transmissive material partially defined by:
a light entry surface defining at least one cavity for receiving a portion of each of said LEDs;
a light emission surface;
a first internal reflecting surface defined by a portion of a parabola; and
a second internal reflecting surface laterally spaced from said row of LEDs,
a first portion of the light passing through said light entry surface is incident upon and redirected by said first internal reflecting surface to be reflected by said second reflecting surface to pass through said light emission surface and a second portion of light passing through said light entry surface is refracted by said optical element to be reflected by said second internal reflecting surface to pass through said light emission surface, substantially all the light passing through said light emission surface having a direction substantially parallel to a plane including the optical axes of the LEDs.

16. The illumination configuration of claim 15, wherein said second internal reflecting surface is parallel to and laterally spaced from said row of LEDs.

17. The illumination configuration of claim 15, wherein said second internal reflecting surface comprises a plurality of parallel, substantially planar internal reflecting surfaces parallel to and laterally spaced from said row of LEDs.

* * * * *